United States Patent [19]

Kirtland

[11] Patent Number: 5,468,436
[45] Date of Patent: Nov. 21, 1995

[54] CONTINUOUS FEED, LOW PRESSURE PROCESS FOR MANUFACTURING THERMOPLASTIC POSTS

[76] Inventor: Ralph Kirtland, 969 Kinzley Ct., Staunton, Va. 24401

[21] Appl. No.: 394,810

[22] Filed: Feb. 27, 1995

Related U.S. Application Data

[62] Division of Ser. No. 51,206, Apr. 22, 1993, abandoned.
[51] Int. Cl.$^6$ .................................................. B29C 47/00
[52] U.S. Cl. ......................... 264/112; 264/115; 264/118; 264/DIG. 69
[58] Field of Search ..................... 264/112, 115, 264/118, 119, DIG. 69

[56] References Cited

U.S. PATENT DOCUMENTS

| | | |
|---|---|---|
| 1,002,667 | 9/1911 | Gare . |
| 1,831,779 | 11/1931 | MacDonald . |
| 2,382,655 | 8/1945 | Nichols . |
| 2,838,801 | 6/1958 | Long et al. . |
| 2,870,793 | 1/1959 | Bailey . |
| 3,013,584 | 12/1961 | Reed et al. . |
| 3,026,564 | 3/1962 | Kohlwey . |
| 3,566,000 | 2/1971 | Maurer . |
| 3,720,401 | 3/1973 | Loch et al. . |
| 3,957,250 | 5/1976 | Murphy . |
| 3,976,730 | 8/1976 | Cushing . |
| 4,303,349 | 12/1981 | Upton . |
| 4,602,765 | 7/1986 | Loper et al. . |
| 4,743,481 | 5/1988 | Quinlan et al. . |
| 4,935,182 | 6/1990 | Ehner et al. .................. 264/112 |
| 4,968,463 | 11/1990 | Levasseur . |
| 5,051,285 | 9/1991 | Borzakian . |
| 5,073,416 | 12/1991 | Avakian et al. . |
| 5,078,367 | 1/1992 | Simpson et al. . |
| 5,088,910 | 2/1992 | Goforth et al. .................. 425/142 |
| 5,102,594 | 4/1992 | Burlet et al. . |
| 5,114,331 | 5/1992 | Umehara et al. . |
| 5,130,076 | 7/1992 | Blatz et al. . |
| 5,145,617 | 9/1992 | Hermanson et al. . |
| 5,232,649 | 8/1993 | Andersen et al. ............. 264/211.23 |
| 5,236,655 | 8/1993 | deSoet .............................. 264/320 |
| 5,246,754 | 9/1993 | Miller . |

FOREIGN PATENT DOCUMENTS

| | | |
|---|---|---|
| 0293337 | 11/1988 | European Pat. Off. . |
| 0340873 | 11/1989 | European Pat. Off. . |

*Primary Examiner*—Mary Lynn Theisen
*Attorney, Agent, or Firm*—Armstrong, Westerman, Hattori, McLeland & Naughton

[57] ABSTRACT

A process and apparatus for manufacturing thermoplastic posts in which granules of thermoplastic scrap material containing water and other contaminants are fed through a constant diameter chamber in a molding device by a rotating auger. The auger extends only halfway into the chamber, thereby subjecting the thermoplastic to much lower amounts of compression and heating than is produced through conventional methods of extrusion. The outer layer of granules is melted an then cooled to form a wall for encasing the more loosely-packed granules in the center core of the post as it exits the chamber. The post material is then cut to length and the ends of the cut posts are cut to a desired shape for driving into the ground or for other purposes.

7 Claims, 4 Drawing Sheets

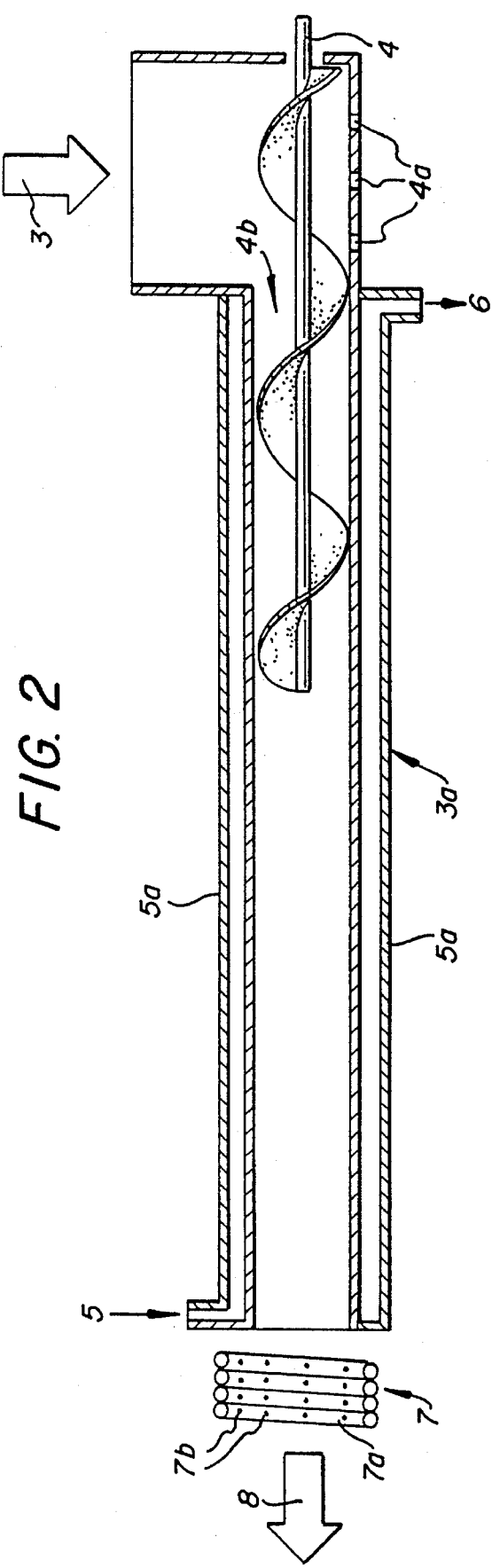
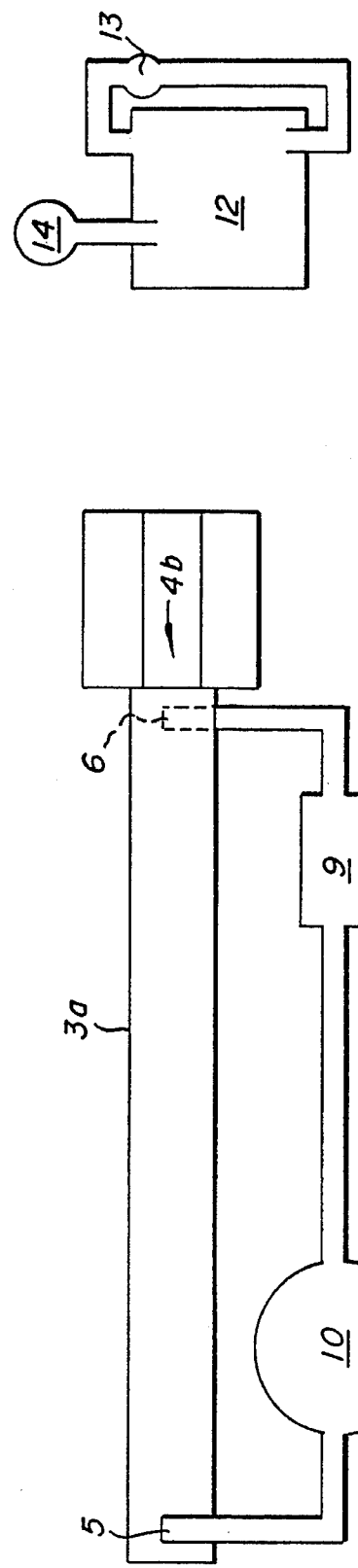

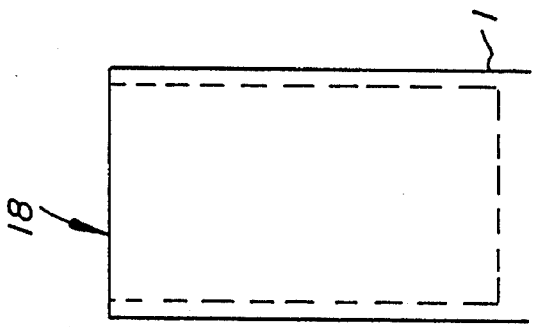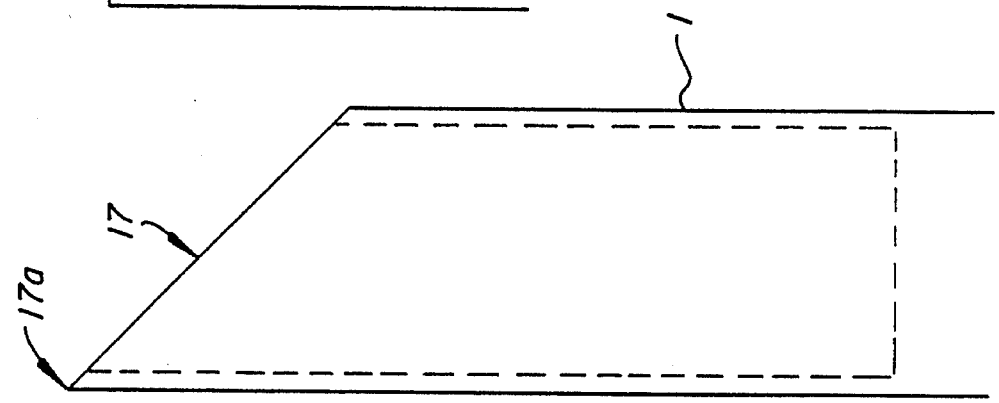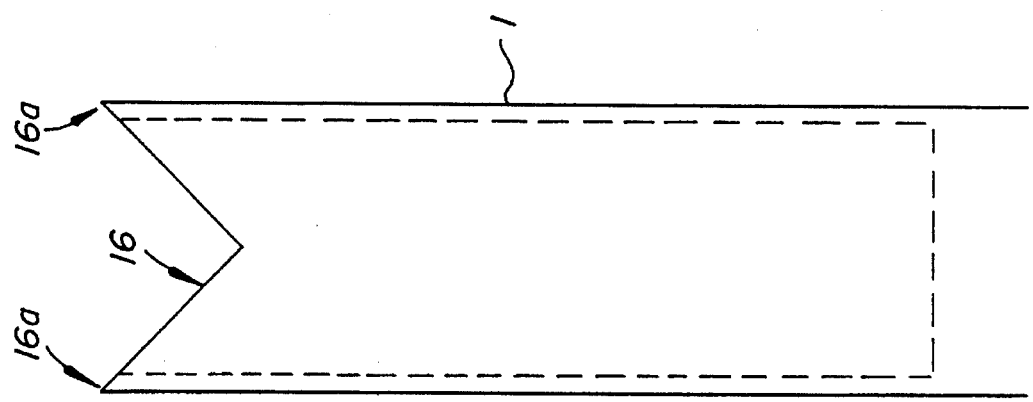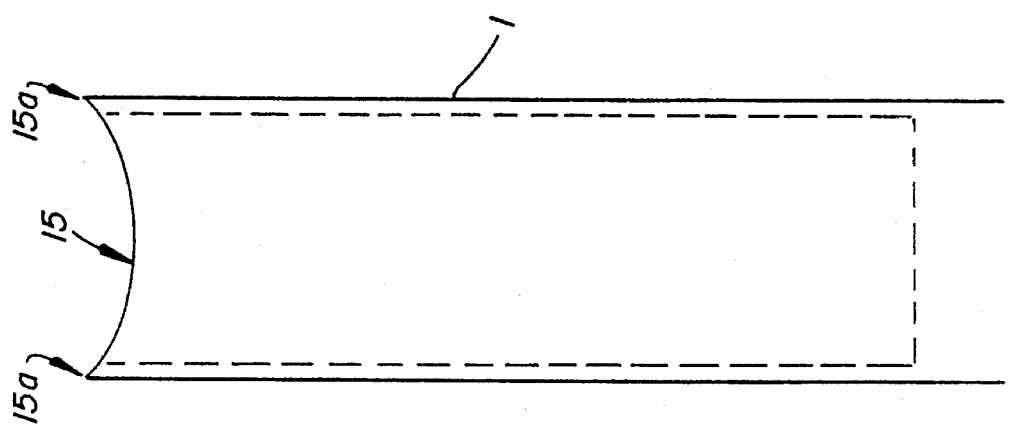

CONTINUOUS FEED, LOW PRESSURE PROCESS FOR MANUFACTURING THERMOPLASTIC POSTS

This is a divisional of application Ser. No. 08/051,206 filed Apr. 22, 1993, now abandoned.

FIELD OF THE INVENTION

This invention relates to the field of plastic lumber manufacturing, utilizing scrap post-consumer and post-industrial thermoplastic which provides a more efficient and less demanding method of turning thermoplastic waste into usable products.

DESCRIPTION OF THE RELATED ART

Currently, the industrialized world is experiencing a glut of scrap thermoplastic in the marketplace. As recycling efforts increase due to the shortage of landfill space, so will the glut of scrap thermoplastic.

A promising outlet for this abundance of material is the manufacture of plastic lumber. Thermoplastic lumber, by its very nature, is less demanding to manufacture than other more conventional products and is resistant to rotting, unlike wood. With thermoplastic, unless sorting is performed according to type, e.g., high-density polyethylene (HDPE), low-density polyethylene (LDPE), polyethylene teraphthalate (PETE), polypropylene (PP), or polystyrene (PS), etc., color choices for the end product are, in most cases, limited to brown or black, which are acceptable substitutes for wood colors. Also, size tolerances are not critical with thermoplastic lumber, thereby making it possible to mix specific quantities of different types (almost always including a large percentage of HDPE).

The major problems facing thermoplastic lumber manufacturers are those facing the thermoplastic industry as a whole, which are segregation and contamination of feed material. Thermoplastic lumber manufacturing currently employs the use of conventional extruders and injection molders, both of which typically force the thermoplastic material into an extruder tube having a constantly-decreasing diameter, causing the material to become completely liquified under high temperatures. Moisture has been found to be the most troublesome contaminant, as under the conditions required to conventionally extrude thermoplastic, moisture turns into high pressure steam, with sometimes explosive results. Furthermore, in a conventional operation, the liquified thermoplastic must be forced through a fine mesh screen in order to filter out dirt. These screens become easily clogged and are often time consuming and expensive to replace. Finally, although not as demanding as the molding of conventional thermoplastic items, the current conventional method for manufacturing thermoplastic lumber is similar enough such that it requires very specific mixture ratios of the different thermoplastic types. All of these requirements cause the cost of manufacturing thermoplastic lumber to be much higher than that of real wood products.

Thus, there is a need for a process that is both less labor intensive and less sensitive regarding feed material mixture ratios and other manufacturing conditions which will produce an end product which is more competitive in price with wood products.

SUMMARY OF THE INVENTION

The present invention utilizes a relatively simple approach towards molding which enables it to be both less ratio-sensitive and less labor intensive than conventional methods for molding thermoplastic lumber.

An important initial step in the preparation of scrap thermoplastic for molding is granulation of the scrap thermoplastic, where granulation is well-known. The size of these granules is determined by the desired texture and potential end use. If a rougher texture is desired and the posts are going to be set in the ground (as opposed to being driven) or the posts are for strictly ornamental purposes, granules can have a volume as large as ½ to ¾ of a cubic inch. If the posts are for driving into the ground and/or a smoother texture is desired, granules should have a volume of less than ½ of a cubic inch.

This material is then fed directly into the machine, contaminants and all. The excessive moisture contamination drains out of the bottom of the machine through drain holes located at the entrance to a heating/compressing (H/C) section. As the material enters the heating/compression section, the pressure between the individual granules increases, thereby forcing much of the water out. Since the water will travel to an area of lower pressure rather than one of higher pressure, the water travels backwards towards the entrance and out of the drain holes. This will remove about 95–99% of the moisture, with the remainder becoming a part of the final product.

As the thermoplastic granules travel down the compression section, propelled by a large-blade/narrow-shaft constant diameter auger, the back pressure created by the act of forcing out the material ahead of it, combined with the ever increasing heat of the heating/compression section (from 370° F. at the entrance to 400° F. at exit), melt the outermost thermoplastic portion forming a wall. Because this machine melts only the outermost thermoplastic at a relatively low pressure (roughly 1/1000th that of a conventional extruder, which uses a constantly decreasing cross-sectional area of barrel and/or auger to squeeze the thermoplastic into a liquid state) due to the constant cross-sectional area of the barrel and auger, the residual moisture, while turning to steam, remains at a relatively low pressure. Also, additional contamination (dirt, oil, etc.) migrates to the unmelted core section, thereby remaining relatively inert and nondamaging to the basic integrity of the finished product.

As the post emerges from the heating/compression (H/C) section, it is immediately cooled by water, which itself is collected, air-cooled (i.e., cool air introduced under water and allowed to bubble to the top), and recirculated. The quantity of coolant necessary is determined by the thickness of the wall of the emerging post, which is itself a variable determined by the speed of the material stream, the heat, and also the length of the heating/compression section. For a wall thickness of 5/16 inch in a six-inch diameter post composed of 75% HDPE and 25% PP, a material stream exit speed of 16 feet/hour, an average heating/compression section temperature of 385° F., and a H/C section length of 13 feet have been found to be necessary.

Because this process is continuous, a post can be made to any length, as one need only cut the post at whatever interval is desired (the most common length used being eight feet long). If the post is for setting in the ground or for ornamental use, the process is now complete. If the post is to be driven into the ground, one end of the post is hollowed out to a depth of 2 to 3 feet, leaving only the outer wall, and then cut to a point. Then, as the post cools, the outer wall contracts, further compressing the innermost material and strengthening the post.

The heating process for the H/C section is as follows: Oil is pumped from a heating unit (similar in concept to a household water heater), around the H/C section, through a pump, and back to the heating unit (to be heated). The advantage to this method is that an inexpensive source of heat (such as propane or natural gas) can be used while being able to locate open flames (potentially dangerous when melting some thermoplastics which can give off explosive vapors) a safe distance from the molding operation. This method also provides a uniform degree of heating around the H/C section, providing for a uniform wall thickness.

BRIEF DESCRIPTION OF THE DRAWINGS

FIG. 2, is a cross-sectional side view of the machine described herein for use in the manufacture of thermoplastic posts utilizing the method of the claimed invention.

FIG. 3 is a top schematic view of the heating unit for use with the machine of FIG. 2.

FIG. 4 is a top schematic view of a cooling unit for use with the machine of FIG. 2.

FIGS. 7(a)–7(d) show cross sections of the ends of the fence posts manufactured according to the method of the claimed invention.

DETAILED DESCRIPTION OF THE PREFERRED EXEMPLARY EMBODIMENT

Figure 1:
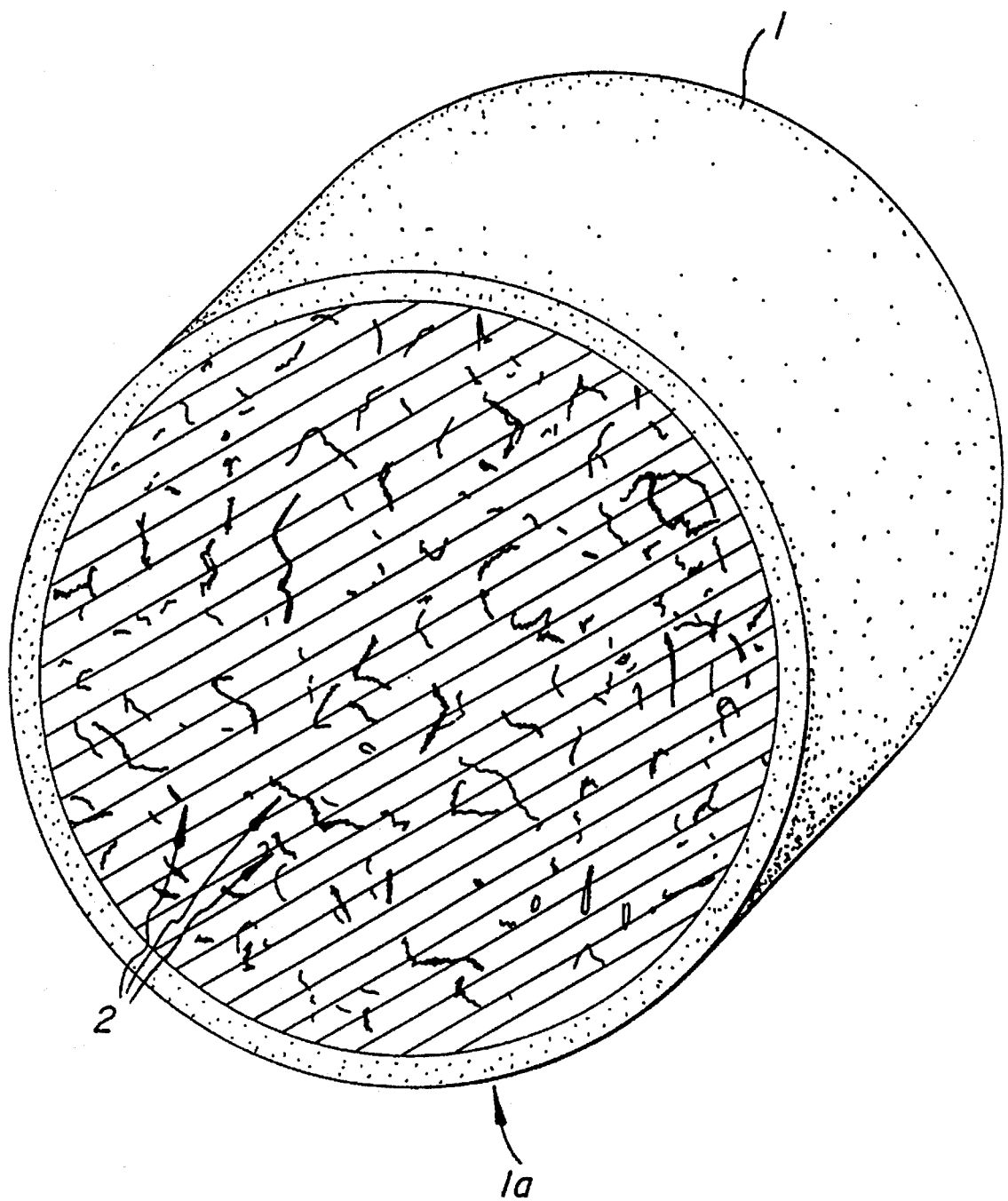
FIG. 1 is a cross-section of a typical post manufactured by the method of the claimed invention.

FIG. 1 is a cross-sectional end-view of the thermoplastic post 1 manufactured by the process described herein. Distinguishing features of the post are a tightly packed composite thermoplastic core 2 surrounded by a hard, solid wall 1a of similar composition as the core.

FIG. 2 is a cross sectional side view of the post molder 3a described herein. Granulated material is fed into post molder 3a through opening 3. Auger 4, which preferably has a length about ½ the length of the chamber 4b, is rotated by an external motor, not shown, which then forces the granulated material into heated chamber 4b. Preferably a ¼ HP gear motor operating at 5.4 rpm rotates the auger at 2.7 rpm with a 2:1 gear reduction ratio. The action of the rotating auger 4 causes compression of the granulated material, which forces excess moisture to exit the machine through drains 4a. As the compressed material travels through chamber 4b, it is heated by hot oil which enters exterior jacket 5a at oil entrance port 5, and exits said jacket at oil exit port 6. This heating, combined with the heat generated by the pressure created from the rotating auger 4, melts the outermost layer of thermoplastic material, forming an outer wall 1a on the post 1, as shown in FIG. 1. As the post 1 exits chamber 4b, it is rapidly cooled by a water spraying device 7. The post 1a continuously exits chamber 4b and then water spraying device 7 through exit 8, and is cut to desired length by a conventional saw (not shown).

A thicker wall 1a of the post 1 may be produced by:

(1) Increasing the temperature of the heating oil;

(2) Increasing the length of the chamber; or (3) Decreasing the rate of flow of the thermoplastic material through the chamber 4b.

FIG. 3 is a top view schematic of the heating apparatus for post molder 3a. Oil travels from oil exit port 6 of heating chamber 4b, through high temperature pump 9, into heating tank 10 to be heated, and back into post molder exterior jacket 5a at oil entrance port 5.

FIG. 4 is a top view schematic of the cooling apparatus for post molder 3a. Water is pumped from a holding tank 12 by a conventional water pump 13 and onto post 1 via water spray device 7. The water is cooled by air forced into the water in holding tank 12 by a conventional blower 14. The water spray device 7 preferably consists of a helical coiled tube 7a having holes 7b for passage of the cooling water.

Figure 5:
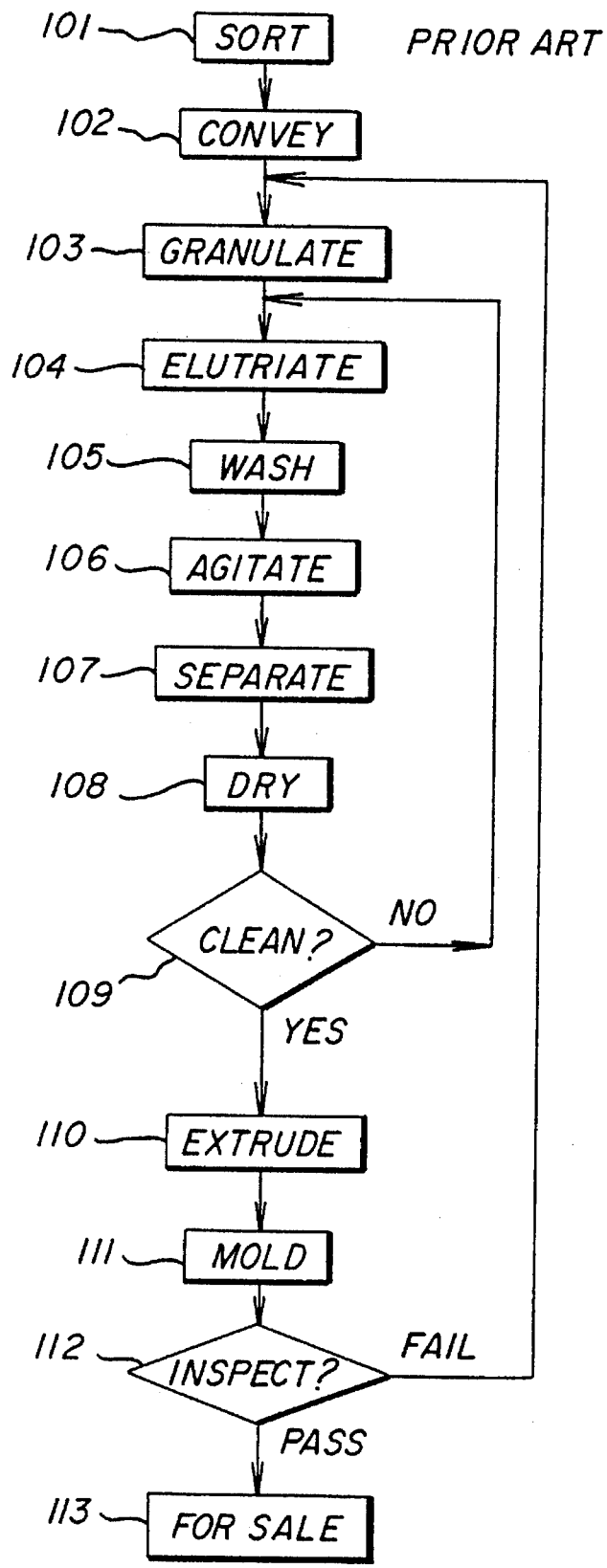
FIG. 5 is a flow chart of the typical process involved in the conventional manufacture of thermoplastic lumber.

FIG. 5 is a flow chart showing the many steps necessary to successfully manufacture thermoplastic lumber using conventional methods.

As shown in FIG. 5, sorting must be performed either by type or by color, at step 101. Then the sorted thermoplastic scrap material is conveyed at step 102 for granulation at step 103.

After granulation, the granules must be elutriated at step 104 (which is the process of separating paper from the plastic with blowers). Then the granules are washed, agitated, separated, and dried, as indicated in steps 105–108, respectively. A determination of adequate cleanliness of the granules must then be made at step 109. If the granules are not adequately clean, steps 104–108 must be cyclically repeated until the granules are adequately clean for the extrusion process, at step 110. Then the post is molded at step 111 and inspected at step 112. If the post fails inspection, the granulation step 103 and steps 104–112 must be performed again. Upon passing inspection, the posts are ready for sale at step 114.

Figure 6:
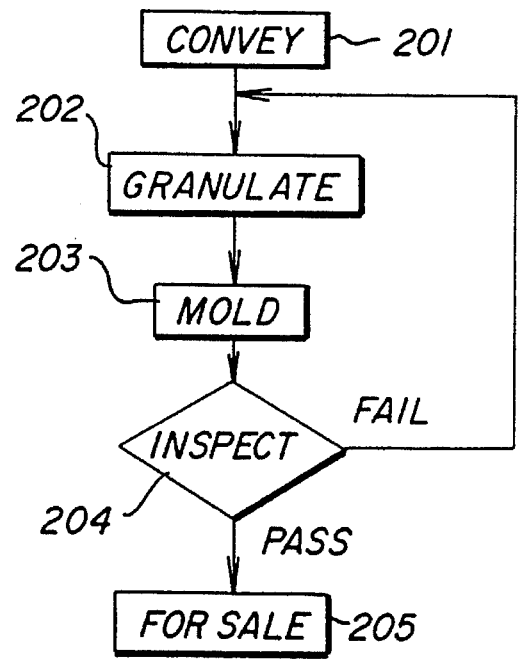
FIG. 6 is a flow chart of the process involved in the manufacture of thermoplastic posts using the method described herein.

FIG. 6 is a flow chart showing the reduced number of steps needed in the manufacture of thermoplastic posts using the method and apparatus of the present invention as compared to conventional method shown in FIG. 5.

As indicated in FIG. 6, neither sorting nor the elaborate granule cleaning steps need be performed in the process of the present invention. The unsorted thermoplastic scrap material is conveyed at step 201 for granulation at step 202. Then the granules are fed into post molder 3a and molded at step 203 via the process of the present invention. No extrusion is performed. Upon exiting the post molder 3a and the water shower 7, the molded post 1 is inspected at step 204 and, upon passing, is ready for sale at step 205.

FIGS. 7(a)–7(d) show the four different hollow point styles for posts 1 that will be driven into the ground. FIG. 7(a) illustrates a "U" shaped point 15 which provides 2 shallow points 15a to force the dirt into the post. FIG. 7(b) illustrates a "V" point shape 16, having two sharp points 16a. FIG. 7(c) illustrates an angle point shape 17, providing a single point 17a. FIG. 7(d) illustrates a simple blunt point shape 18.

Although a preferred exemplary embodiment has been illustrated and described, it is to be understood that the above-described embodiment is but one illustration of the principles of the invention. Various modifications and changes may be made thereto by those of ordinary skill in the art which will embody the principles of the invention and fall within the spirit and scope thereof.

What is claimed is:

1. A process for manufacturing thermoplastic posts, comprising the steps of:

forming thermoplastic scrap material containing a plurality of contaminants into granules;

feeding the granules of thermoplastic scrap material through a chamber in a molding device, wherein the chamber has a substantially constant diameter, thereby placing the granules under compression and raising the temperature of the granules;

heating an outer portion of the granules as the granules pass through the chamber, producing a molten outer layer of the thermoplastic scrap material being fed through said chamber;

cooling the molten outer layer of thermoplastic scrap material as it leaves the chamber to form an outer wall having a desired thickness; and cutting the cooled thermoplastic scrap material to produce at least one thermoplastic post having a desired length.

2. A process for manufacturing thermoplastic posts as recited in claim 1, wherein the heating step comprises circulating heating oil in a jacket which surrounds the chamber in the molding device.

3. A process for manufacturing thermoplastic posts as recited in claim 1, wherein the cooling step includes spraying water under pressure through holes in a coiled tube surrounding the thermoplastic scrap material after the thermoplastic scrap material leaves the chamber.

4. A process for manufacturing thermoplastic posts as recited in claim 1, wherein the feeding step includes rotating an auger to feed the granules of the thermoplastic scrap material through the passage of the molding device.

5. A process for manufacturing thermoplastic posts as recited in claim 1, comprising the additional steps of:

hollowing one end of the post such that only the outer wall is left; and cutting the hollowed end of the post to a pointed shape.

6. A process for manufacturing thermoplastic posts as recited in claim 1, wherein said feeding step further comprises the steps of heating the granules and removing water from the granules.

7. A process for manufacturing thermoplastic posts as recited in claim 6, wherein said heating step includes heating the granules to a temperature of not less than 370° F. and not greater than 400° F.

\* \* \* \* \*